United States Patent
Eichstaedt et al.

(10) Patent No.: US 8,694,367 B2
(45) Date of Patent: Apr. 8, 2014

(54) COUPON SOCIAL NETWORKING PLATFORM

(75) Inventors: Matthias Eichstaedt, San Jose, CA (US); Deepak Goel, Fremont, CA (US); Sunil Keshav Bopardikar, Sunnyvale, CA (US)

(73) Assignee: Coupons.com Incorporated, Mt. View, CA (US)

( * ) Notice: Subject to any disclaimer, the term of this patent is extended or adjusted under 35 U.S.C. 154(b) by 0 days.

(21) Appl. No.: 13/287,696

(22) Filed: Nov. 2, 2011

(65) Prior Publication Data

US 2013/0030901 A1    Jan. 31, 2013

Related U.S. Application Data

(60) Provisional application No. 61/513,330, filed on Jul. 29, 2011.

(51) Int. Cl.
*G06Q 30/00* (2012.01)
(52) U.S. Cl.
USPC .................. 705/14.13; 705/14.23; 705/14.16; 705/14.1
(58) Field of Classification Search
USPC ....................................................... 705/14.13
See application file for complete search history.

(56) References Cited

U.S. PATENT DOCUMENTS

| | | | |
|---|---|---|---|
| 4,745,468 A | 5/1988 | Von Kohorn | |
| 4,876,592 A | 10/1989 | Von Kohorn | |
| 4,926,255 A | 5/1990 | Von Kohorn | |
| 5,034,807 A | 7/1991 | Von Kohorn | |
| 5,057,915 A | 10/1991 | Von Kohorn | |
| 5,128,752 A | 7/1992 | Von Kohrn | |
| 5,227,874 A | 7/1993 | Von Kohorn | |
| 5,249,044 A | 9/1993 | Von Kohorn | |
| 5,250,789 A * | 10/1993 | Johnsen | 705/14.23 |
| 5,283,734 A | 2/1994 | Von Kohrn | |
| 5,368,129 A | 11/1994 | Von Kohrn | |

(Continued)

FOREIGN PATENT DOCUMENTS

| | | |
|---|---|---|
| AU | 2006/294868 | 6/2011 |
| KR | 10-2002-0074032 | 9/2002 |

OTHER PUBLICATIONS

Van Grove, "Twitter to Facebook: 5 Ways to Post to Both", Mashable, May 25, 2009, found on line at mashable.com/2009/05/25/twitter-to-facebook/.*

(Continued)

*Primary Examiner* — John G Weiss
*Assistant Examiner* — Scott C Anderson
(74) *Attorney, Agent, or Firm* — Hickman Palermo Truong Becker Bingham Wong LLP; Daniel D. Ledesma

(57) ABSTRACT

Techniques are provided for allowing a user to access a coupon. In one approach, a social network coupon platform receives a request to display coupon data regarding a particular coupon that is provided by a coupon provider, wherein a user that is registered with a social network provider initiated the request. In response to receiving the request, sending the coupon data is sent form the social network coupon platform to be displayed to the user. Profile data that includes profile information of the user is received at the social network coupon platform from the social network provider. In response to receiving the profile data, the user is allowed access to the particular coupon.

27 Claims, 5 Drawing Sheets

(56) References Cited

U.S. PATENT DOCUMENTS

| | | | |
|---|---|---|---|
| 5,508,731 A | 4/1996 | Kohorn | |
| 5,697,844 A | 12/1997 | Von Kohrn | |
| 5,713,795 A | 2/1998 | Von Kohrn | |
| 5,759,101 A | 6/1998 | Von Kohrn | |
| 5,761,648 A | 6/1998 | Golden et al. | |
| 5,791,991 A | 8/1998 | Small | |
| 5,907,830 A | 5/1999 | Engel et al. | |
| 5,916,024 A | 6/1999 | Von Kohrn | |
| 6,321,208 B1 | 11/2001 | Barnett | |
| 6,336,099 B1 | 1/2002 | Barnett et al. | |
| 7,640,240 B2 | 12/2009 | Boal et al. | |
| 7,734,621 B2 | 6/2010 | Weitzman et al. | |
| 7,784,702 B2 | 8/2010 | Michels | |
| 7,962,931 B2 | 6/2011 | Bova | |
| 8,000,496 B2 | 8/2011 | Keswanie et al. | |
| 8,055,642 B2 | 11/2011 | Boal et al. | |
| 8,165,078 B2 | 4/2012 | Walsh et al. | |
| 2002/0042739 A1 | 4/2002 | Srinivasan et al. | |
| 2002/0065713 A1 | 5/2002 | Awada et al. | |
| 2002/0198843 A1 | 12/2002 | Wang et al. | |
| 2004/0236607 A1* | 11/2004 | Kost et al. | 705/2 |
| 2005/0216300 A1 | 9/2005 | Appelman et al. | |
| 2006/0212355 A1* | 9/2006 | Teague et al. | 705/14 |
| 2008/0133336 A1* | 6/2008 | Altman et al. | 705/10 |
| 2008/0275767 A1 | 11/2008 | Rafie | |
| 2009/0024477 A1 | 1/2009 | Kramer et al. | |
| 2009/0076912 A1 | 3/2009 | Rajan et al. | |
| 2010/0094940 A1 | 4/2010 | Tsai et al. | |
| 2010/0185504 A1* | 7/2010 | Rajan et al. | 705/14.13 |
| 2010/0228617 A1 | 9/2010 | Ransom et al. | |
| 2011/0023101 A1 | 1/2011 | Vernal et al. | |
| 2011/0106600 A1 | 5/2011 | Malik et al. | |
| 2012/0071235 A1 | 3/2012 | Walker et al. | |
| 2013/0030895 A1 | 1/2013 | Eichstaedt et al. | |
| 2013/0030901 A1 | 1/2013 | Eichstaedt et al. | |

OTHER PUBLICATIONS

International Search Report and Written Opinion received in International application No. PCT/US12/48048 dated Feb. 13, 2013 (9 pages).

Current Claims of International application No. PCT/US12/48048 dated Feb. 2013 (5 pages).

International Search Report and Written Opinion received in International application No. PCT/US12/48107 dated Feb. 15, 2013 (10 pages).

Current Claims of International application No. PCT/US12/48107 dated Feb. 2013 (3 pages).

International Search Report and Written Opinion received in International application No. PCT/US12/48126 dated Feb. 15, 2013 (10 pages).

Current Claims of International application No. PCT/US12/48126 dated Feb. 2013 (4 pages).

U.S. Appl. No. 13/540,339, filed Jul. 2, 2012, Final Office Action.

* cited by examiner

COUPON SOCIAL NETWORKING PLATFORM

CROSS-REFERENCE TO BENEFIT CLAIM

This application claims the benefit of Provisional Appln. 61/513,330, filed Jul. 29, 2011, the entire contents of which is hereby incorporated by reference as if fully set forth herein, under 35 U.S.C. §119(e).

TECHNICAL FIELD

Embodiments relate generally to a platform for providing coupons in a social network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In general, a coupon is a certificate or other document that entitles its holder to accept an offer described or referenced by the coupon. The offer, also subsequently referred to as the "coupon offer," may be any type of offer, but typically is an offer by the coupon provider to provide a customer with one or more goods or services at a particular price or discount. For example, a coupon might indicate $1 off or 25% off of the purchase price or might indicate a particular price, such as $10. Alternatively, the coupon offer may be an offer to provide the customer with a gift in exchange for the performance of an act, such as purchasing a good or service.

A coupon often takes a "hard copy" form, such as a paper certificate, with printed images and/or text describing terms of the offer. "Redeeming" a coupon is the process of a customer accepting a coupon offer by presenting, referencing, or otherwise providing the coupon while purchasing, contracting, or otherwise transacting with another party. For example, a customer may redeem a hard copy of a coupon by handing the copy to a clerk during a purchase at a retail store. The clerk may then provide the customer with the offered discounted price or gift.

One technique for distributing coupons is to include printed coupons with newspapers, magazines, or other items that are distributed to customers. One example of an item with which coupons are distributed is a printed receipt. For example, some retailers print receipts at a point of sale on register paper on which coupons have been pre-printed. As another example, some retailers print coupon(s) on a receipt at the time of the transaction for which the receipt is printed, thereby allowing the retailers to dynamically select which coupon(s) appear on the receipt based on the product(s) that were purchased during the transaction.

Recent distribution techniques now provide customers with opportunities to print their own coupons. For example, a number of websites provide search engines or catalogs with which customers may locate offers and then print coupons for the offers they find. The printed coupons may be used in the same manner as any other coupon.

Other recent distribution techniques involve creating digital coupons. One such technique involves creating unique digital coupons that are saved to an account associated with the customer, such as a store loyalty account. The customer may redeem such digital coupons during online or physical transactions by presenting an account identifier, such as a store loyalty card or an oral identification of the customer's telephone number, for the associated account.

Another digital coupon-based technique involves creating unique digital coupons that may be stored on a computing device. The digital coupons may be transmitted from the computing device at a point-of-sale during a transaction using any of a variety of mechanisms. Thus, there are numerous ways in which coupons might be distributed to customers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
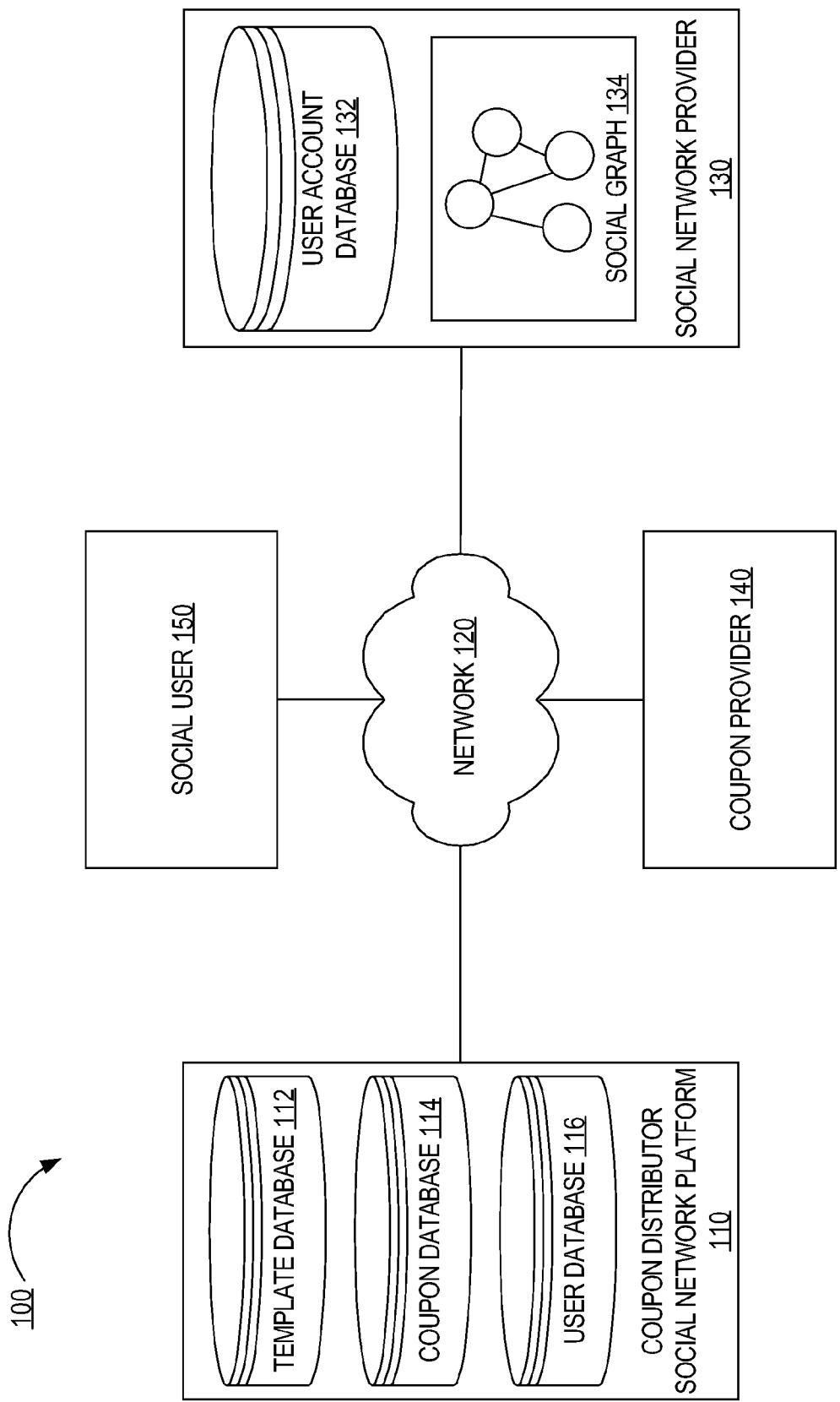
FIG. 1 is a block diagram that depicts an example system architecture for distributing coupons in a social network.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. Architectural Overview
    3.0. Publisher Creating Content
    4.0. Social User Accessing A Coupon
    5.0. Webpage Traversal
    6.0. Distributor Using User Data to Distribute Coupons
    7.0. Implementation Mechanism—Hardware Overview
    8.0. Extensions and Alternatives 1.0. General Overview The advent of social networking services (such as Facebook, LinkedIn, Google+, Hi5, Twitter, and others) has initiated a novel breed of applications that leverage a social graph. While the majority of the applications are focused on multi-player games (such as FarmVille, Phrases, and Treasure Isle) the commercial potential of social networks is largely underutilized. Additionally, such applications are custom-built applications for one specific offering or product. Thus, these applications are neither inherently scalable nor generic.

An embodiment provides a customizable data processing platform for coupons, deals, and offers on a social network or other Web service. "Platform," in this context, may refer to one or more computers that are configured with logic, or host computer programs, that are configured to perform the processes and functions that are further described herein. In an embodiment, one or more server computers are configured with one or more computer programs that implement a platform that supports the creation and distribution of discount coupons or other commercial offers using social networks. For purposes of illustrating a clear example, in this description the term "coupon" is used for simplicity to refer to a particular kind of commercial offer, but embodiments are not limited to cents-off coupons or other forms of discount coupons. Thus, in this description, the term "coupon" may include any form of commercial offer to a consumer, enterprise, or other user of a social networking platform.

Although embodiments are applicable to coupons for services, for purposes of brevity, the following description refers only to coupons for products. "Coupon provider" refers to an entity (such as a manufacturer of a product or a service provider) that seeks to have one or more coupons for its product to be distributed to potential customers. In an embodiment, a third-party entity or agency represents a manufacturer and acts on their behalf. Thus, such an agency may be viewed as a coupon provider, at least from the perspective of a coupon distributor.

In an embodiment, techniques are provided for providing a coupon distribution platform for distributing coupons in a social network provided by a social network provider. The coupon distribution platform stores coupon data regarding multiple coupon campaigns initiated by multiple coupon providers. The coupon distribution platform distributes coupons to users registered with the social network provider. In one technique, the users agree to create a link between them and the coupons to which the users seek access. In another technique, the users agree to share profile information with the coupon distribution platform in order to access coupons. In one embodiment, the coupon distribution platform might identify, based on the profile information, a group of users for receiving messages and the group of users may be identified based on the users' age, gender, and interests indicated in the profile information.

2.0. Architectural Overview

FIG. 1 is a block diagram that depicts an example system architecture 100 for distributing coupons using a social network. System architecture 100 includes coupon distributor social network platform 110 (or "distributor SNP 110" for short), network 120, social network provider 130, coupon provider 140, and social user 150. One or more computers may implement each of the elements of FIG. 1.

Distributor SNP 110 includes one or more computing devices and one or more storage devices that store data regarding coupons of one or more coupon providers and users of one or more social network providers. In the depicted example, distributor SNP 110 includes a template database 112, a coupon database 114, and a user database 116, each of which is described in more detail below. Each of databases 112-116 may be part of the same storage device or may be part of separate storage devices.

In an embodiment, the logic, configuration or programs hosted in distributor SNP 110: allows customized coupons to be created by coupon provider 140 and distributed to users of social network provider 130; causes new coupon nodes to be introduced into a social graph of social network provider 130; allows a user of social network provider 130 to link his/her node to a coupon node in the social graph; gathers and stores information about users of social network provider 130 (and, optionally, of other social network providers, not shown) and/or groups users into sets according to one or more criteria, such as demographic information of the users or the content nodes to which the users are linked.

The functionality of distributor SNP 110 may be implemented using stored program logic in one or more special-purpose computers or loaded from one or more non-transitory media into the memory of one or more general-purpose computer and then executed.

Communication between any one or more of distributor SNP 110 and coupon provider 140, social user 150 and social network provider 130, distributor SNP 110 and social user 150, and distributor SNP 110 and social network provider 130 may be made over a network 120. Network 120 may be implemented by any medium or mechanism that provides for the exchange of data between various entities communicatively coupled to network 120. Examples of network 120 include, without limitation, a network such as a Local Area Network (LAN), Wide Area Network (WAN), Ethernet or the Internet, or one or more terrestrial, satellite, or wireless links. Network 120 may include a combination of networks such as those described. Network 120 may transmit data according to Transmission Control Protocol (TCP), User Datagram Protocol (UDP), and/or Internet Protocol (IP).

Social network provider 130 provides a social networking service. Examples of social network providers include Facebook, Google Plus, Twitter, and Hi5. Social network provider 130 includes one or more computing devices and one or more storage devices that store data (for example, in user account database 132) regarding one or more of users that are registered with the service, and connections between users and between users and content. Users may be individuals or organizations, such as business entities. The connections between users and between users and content items may be viewed as a social graph, such as social graph 134. Although only a single social network provider 130 is depicted in FIG. 1, system architecture 100 might include multiple social network providers with which distributor SNP 110 interacts in order to distribute coupons and, in one embodiment, targeted messages to users that are registered with the various social network providers.

Coupon provider 140 is a business entity that manufactures a product or represents a brand and issues coupons (or authorizes a third-party to issue coupons on its behalf) to encourage the purchase of a product that is subject of a coupon campaign that coupon provider 140 initiates. Coupon provider 140 communicates coupon data to distributor SNP 110 over network 120. The coupon data includes information about one or more coupons of one or more coupon campaigns managed by distributor SNP 110. Distributor SNP 110 is responsible for acting on behalf of coupon provider 140 to distribute coupons reflected in the coupon data to users of social network provider 130.

Although only a single coupon provider 140 is depicted in FIG. 1, system architecture 100 might include numerous coupon providers, each of which is registered with social network provider 130 and contracts with distributor SNP 110 to run their respective coupon campaigns. Thus, coupon database 114 might include coupon data for multiple coupon campaigns from multiple coupon providers.

Social user 150 is any potential customer that is registered with social network provider 130. Social user 150 may use one or multiple computing devices to access a social network service provided by social network provider 130. Examples of computing devices that a social user might use to access the social network service and obtain a coupon include a desktop computer, a laptop computer, a tablet computer, and a smartphone. Although only a single social user 150 is depicted in FIG. 1, system architecture 100 might include numerous social users, each of which is registered with social network provider 130. Thus, user database 116 might include user data for multiple users of social network provider 130 and multiple users of other social network providers (not depicted).

3.0. Publisher Creating Content

Figure 2:
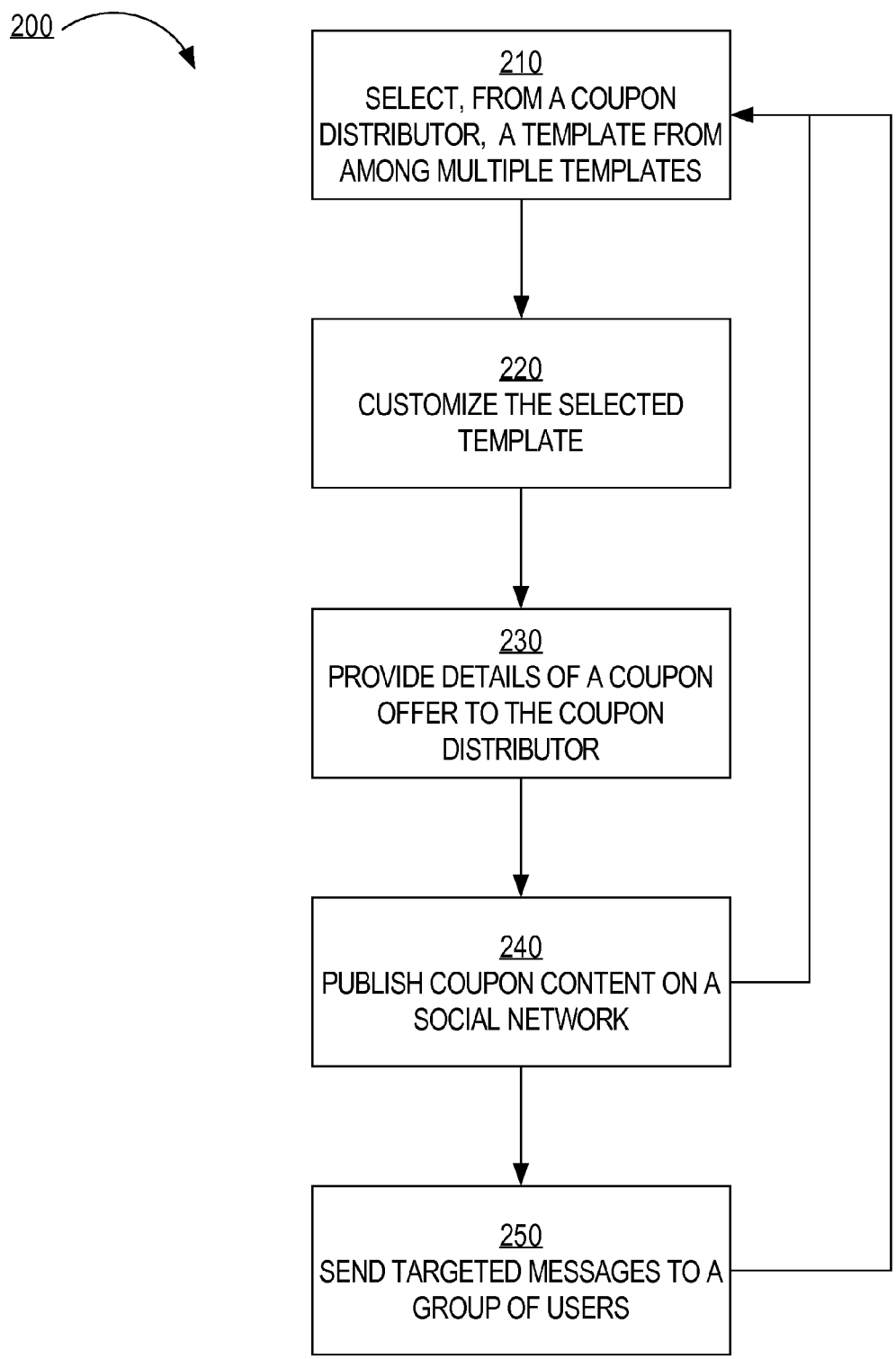
FIG. 2 is a flow diagram that depicts a process for a publisher to publish customized content.

FIG. 2 is a flow diagram that depicts an example process 200 for a publisher to create content, such as electronic coupon offers.

At block 210, the publisher selects a template, from a plurality of templates, provided by a coupon distributor. For example, coupon provider 140 accesses a web service provided by distributor SNP 110, where the web service allows coupon provider 140 to select a template. Distributor SNP 110 stores the plurality of templates in and retrieves the plurality of templates from template database 112. Each template dictates how certain data is to be displayed within an electronic document (such as a web page) that is sent to computing device of an end-user that requests the document. Thus, a template dictates a layout of data, at least some of which is provided by the publisher. The template might also dictate what data is displayed to a potential customer at each stage of a process for accessing a coupon, such as a stage prior to a link between the potential customer and the coupon being created in a social graph, a stage after the link is created, and a stage after the potential customer has access to the coupon.

At block 220, the publisher customizes the selected template. One purpose for customizing a template might be to create a visual experience for a social user (for example, social user 150) that is related to the marketing efforts of the publisher, such as the use of certain colors, logos, graphics, and sounds. The customization may involve the publisher sending, to the coupon distributor, text, one or more images, one or more video clips, and/or one or more audio clips to be stored in association with the selected template. Alternatively, the publisher might use a tool (provided by the coupon distributor or the publisher) to customize the selected template locally and then send the customized template to the coupon distributor. The coupon distributor can store the customized template in association with data that identifies the publisher so that the publisher may access the customized template later for another coupon campaign.

For example, coupon provider 140 sends template data to distributor SNP 130. Distributor SNP 130 might apply the template data to the selected template to create a customized template or the template data might already represent a customized template. In either case, distributor SNP 130 stores the customized template in coupon database 114 and, optionally, in template database 112. If the customized template is stored in template database 112, distributor SNP 130 also stores identification data in association with the customized template to allow distributor SNP 112 to present the customized template to coupon provider 140 the next time coupon provider 140 decides to initiate another coupon campaign.

At block 230, the publisher provides, to the coupon distributor, details of a coupon offer, such as title, summary, a digital image, a price, and/or teaser content. The coupon distributor stores the details in association with the customized template. In response, the coupon distributor provides, to the publisher, a URL that references the coupon distributor.

For example, coupon provider 140 sends one or more details of a coupon offer over network 120 to distributor SNP 110. Distributor SNP 110 stores the details in coupon database 114 and in association with a particular (for example, customized) template. Distributor SNP 110 creates a URL and provides the URL to coupon provider 140. The URL includes data that is associated with the details of the coupon offer, which is associated with the particular template. Coupon provider 140, which is registered with social network provider 130, sends the URL to social network provider 130 to be stored in association with an account of the coupon provider 140.

At block 240, the publisher causes the coupon content to be "published" on a social network, such as on a "fan" of home page of the publisher. The publisher "publishes" coupon content by configuring its fan page (i.e., hosted by the social network provider) to include the URL provided by the coupon distributor. Although publishing implies potential customers viewing published material, the details of the coupon offer are not viewed by a potential customer until the customer requests the fan page of the publisher. When the URL is processed by an end user's browser, the URL is sent to the coupon distributor, which identifies the appropriate content (i.e., customized template and coupon offer details) and sends that content to the browser to be displayed.

For example, a computing device of social user 150 displays a web page that is hosted by an entity that is different than social network provider 130. The web page includes a link to a "fan" or home page of coupon provider 140. Social network provider 130 hosts the home page. By selecting the link, the computing device of social user 150 sends a (for example, HTTP) request, over network 120, to social network provider 130. Social network provider 130 receives the request and identifies an account of coupon provider 140. Social network provider 130 sends, to social user 150's computing device, a web data that is processed by a web browser executing on the computing device. The web data includes a URL that was created by distributor SNP 110. The web browser identifies the URL and sends, to distributor SNP 130, a (for example, HTTP) request that includes the URL. Distributor SNP 130 receives the request, uses the URL in the request to identify the appropriate coupon campaign details in coupon database 114 and the corresponding template (from template database 112, if the corresponding template is stored separately), and sends, to the computing device of social user 150, document data that is based on the corresponding template and that includes the appropriate details of the coupon offer. The browser of social user 150 generates, based on the document data, a web page that includes details of the coupon offer and that is formatted based on the identified template.

In a related embodiment, the fan page hosted by the social network provider is associated with an account of the coupon distributor. The coupon distributor might have multiple pages (hosted by the social network provider) that are accessible to users of the social network provider, where each page is associated with a different coupon provider or brand. In this way, the coupon provider is not required to register with (or otherwise interact with) the social network provider in order to provide coupons to users of the social network provider. Instead, the coupon distributor is required to register with the social network provider and initiate the creation of provider "fan" pages.

After block 240, process 200 might proceed to block 250 or return to block 210 where the publisher selects another template for another coupon campaign.

At block 250, the publisher sends targeted messages to a group of users. In a related embodiment, the coupon distributor sends the messages on behalf of the publisher if the coupon distributor has access to and maintains information about users that have chosen to share their respective profile information with the publisher or coupon distributor (described in more detail below).

In an embodiment, the targeted messages are concerned with one or more coupons of subsequent coupon campaigns. For a particular user that took advantage of a first coupon campaign (for example, by printing out a coupon for the product of the first coupon campaign), a subsequent coupon campaign may be for the same product of the first coupon campaign, for a different product from the same manufacturer or brand as the first coupon campaign, or for a product from a different manufacturer. In this latter example, the coupon distributor is responsible for sending the targeted messages.

After block 250, process 200 might return to block 210 where the publisher selects another template for another coupon campaign.

4.0. Social User Accessing a Coupon

Figure 3:
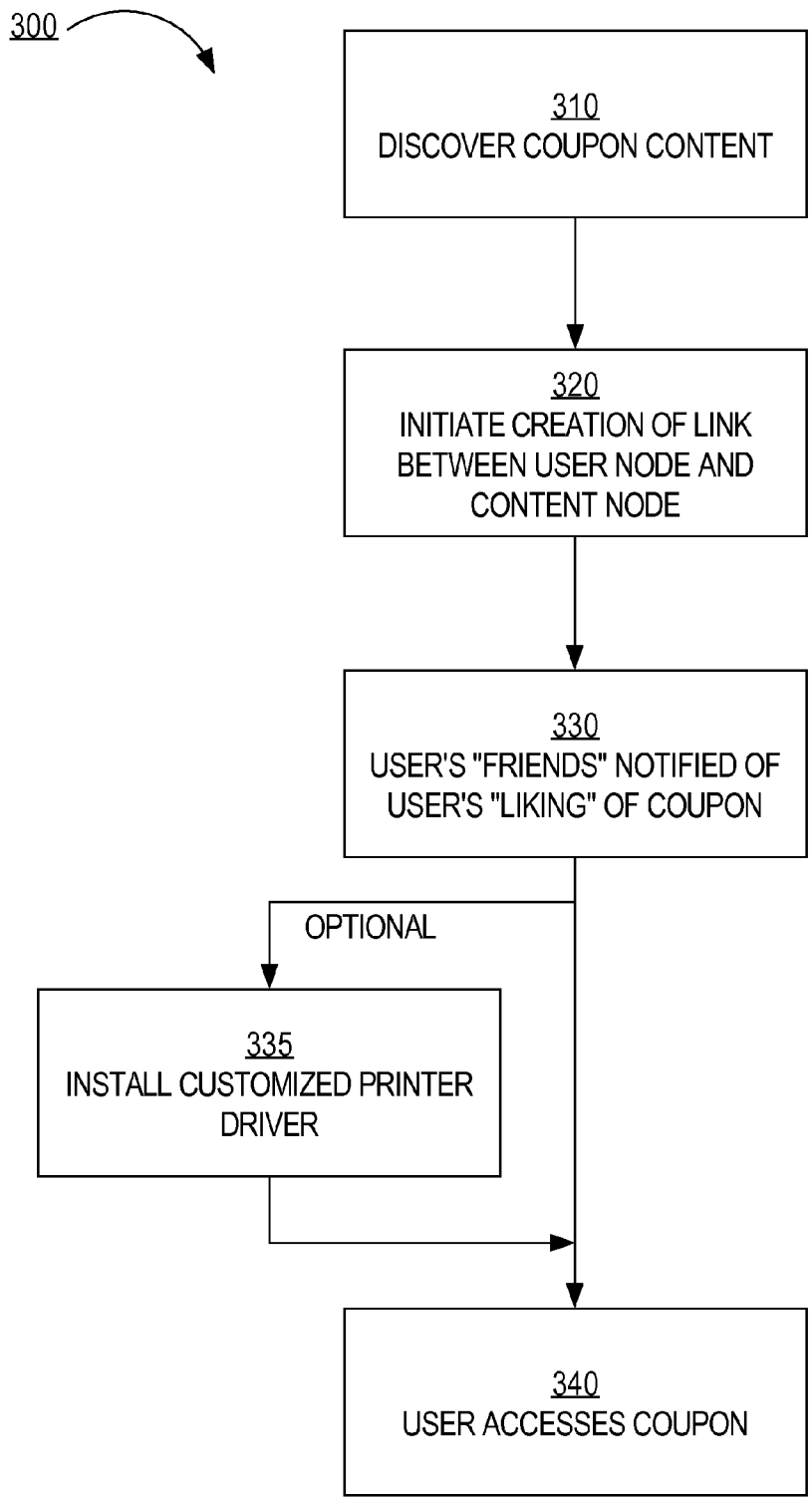
FIG. 3 is a flow diagram that depicts a process for a social network user to access a coupon in the social network.

FIG. 3 is a block diagram that depicts an example process 300 for a user to access a coupon in a social network. At block 310, a user discovers coupon content. A user might discover coupon content in numerous locations. For example, social user 150 might discover a link to coupon content on a web page provided by a coupon distributor, on a search results page provided by a search engine, or on any other web page that contains a link to (or otherwise advertises) the coupon. Social user 150 selects the link and is taken to a "fan" or home page of coupon provider 140. The home page is hosted by social network provider 130. The home page includes details of an electronic coupon offer of a coupon campaign initiated by coupon provider 140.

At block 320, the user initiates the creation of a link between the user's profile in the social network and a node that represents the coupon (or "coupon node"). For example, social user 150 selects a "Like" or "+" button that is displayed adjacent to the electronic coupon offer on the home page. If social user 150 selects the "Like" button, then social network provider 130 creates a link, in social graph 134, between a node that represents social user 150 and a node that represents the coupon.

At block 330, in response to the user "liking" the coupon, the social network provider notifies the user's "friends" (or those who are connected to the user in the social network) that the user "liked" the coupon. Requiring a user to "like" a coupon before providing access to the coupon is a way to quickly and inexpensively advertise to the coupon (and, as a result, the product and the brand) to numerous people.

Block 330 might also comprise requiring the user to "install" an application that distributor SNP 110 provides in order to access the coupon. The user agrees to allow the application access to personal information of the user that is stored, for example, in user account database 132. "Installing" the application may involve social network provider 130 storing data that associates the application with the user that agreed to the terms of the offer to provide personal information in exchange for a coupon. Thereafter, the application is allowed access, by social network provider 130, to certain private information of the user, such as gender, age, residence, and interests. In an embodiment, the application executes on a computing device of distributor SNP 110 and uses an API of social network provider 130 to issue one or more calls to social network provider 130 in order to retrieve profile information of the user and store the information in user database 116.

In an embodiment, the user is required to input additional information (such as email or other contact information) that the application can use to send messages to the user in the future. Such messages might include information about other coupon campaigns in which the user might be interested.

After "installing" the application once, the next time the user desires access to a coupon distributed by the coupon distributor, the user is not required to install the application again, regardless of whether the coupon is from the same coupon provider as the first coupon or from a different coupon provider. This is so because the user has already installed the application. The application can access private information of the user and, according to an embodiment, send messages to the user at any time after the user's installation. Therefore, the user may be required to install the application only once.

At block 340, the user is provided access to the coupon. For example, in response to social user 150 "liking" the coupon and accepting any terms of an agreement to share profile information with coupon provider 140 or distributor SNP 110, distributor SNP 110 causes the coupon to be displayed to social user 150. Social user 150 is allowed to print the coupon or otherwise access details of the coupon to enable social user 150 to use the coupon later, whether in a physical store ("point of sale") or in a digital context. For example, distributor SNP 110 might send a coupon code of the coupon to social user 150. Later, social user 150 accesses a website provided by coupon provider 140 or an affiliate of coupon provider 140 and enters the coupon code when purchasing the corresponding product through the website.

In an optional block 335 prior to block 340, the user is required to install a customized print driver on the user's device if the print driver is not already installed. The print driver operates together with the coupon distributor to determine whether the user is allowed to access the coupon. For example, if social user 150 desires to print the coupon, then social user 150 is required to download (if not already installed), from distributor SNP 110, a customized print driver to the user's device. Once installed, the print driver communicates with distributor SNP 110 to determine whether social user 150 can access the coupon. For example, each time social user 150 requests to print a coupon using the print driver, distributor SNP 110 is first notified and determines whether social user 150 is allowed access to the coupon. If social user 150 has already printed a particular coupon (or has printed the particular coupon a threshold number of times), then distributor SNP 110 notifies the print driver, which prevents social user 150 from accessing (for example, printing) the particular coupon. Conversely, if social user 150 has not yet printed the particular coupon (or has printed the particular coupon less than a threshold number of times), then distributor SNP 110 notifies the print driver, which allows social user 150 access (for example, via printing or displaying the necessary coupon details) to the coupon.

5.0. Webpage Traversal

Figure 4:
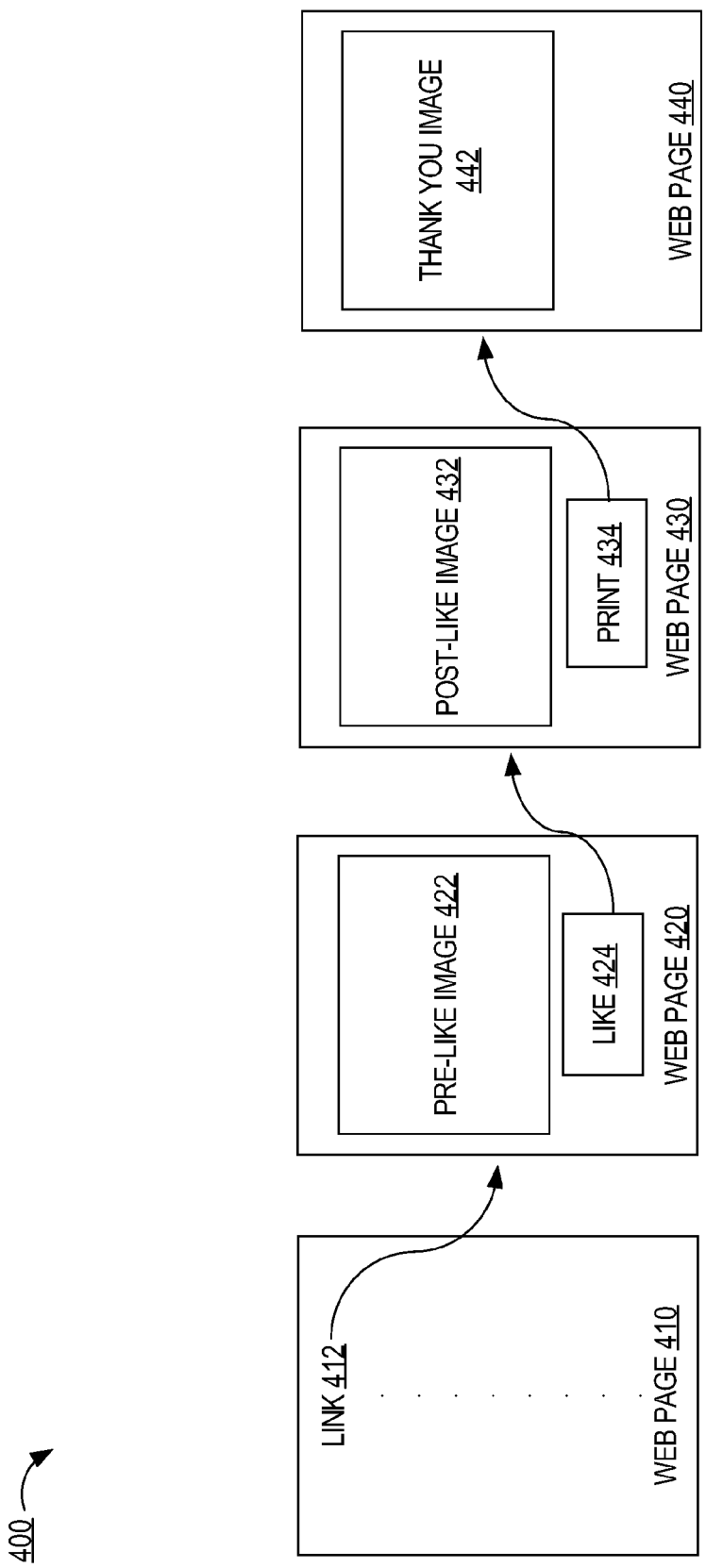
FIG. 4 is a block diagram that depicts a sequence of web pages that a social user might traverse to access a coupon that is provided by a coupon provider and distributed by a coupon distributor via a social network.

FIG. 4 is a block diagram that depicts a sequence of web pages that a social user might traverse to access a coupon that is provided by a coupon provider and distributed by a coupon distributor via a social network.

Web page 410 is a web page viewed by social user 150. Web page 410 might be a web page provided by a coupon distributor (for example, that operates distributor SNP 110), a search results page provided by a search engine, or some other web page that includes link 412. Web page 410 might include an image and/or other information about a coupon that is the subject of a coupon campaign initiated by coupon provider 140 and run by the coupon distributor. The information about the coupon might include an image and name of the product, a discount amount, a date when the coupon expires, the source of the coupon (for example, identifying a brand or manufacturer), and instructions on how to access the coupon.

Link 412 is a link to a web page 420 hosted by social network provider 130. Link 412 might be a first URL that includes data that identifies, to distributor SNP 110, the coupon or a coupon campaign. In response to social user 150 selecting link 412, social user 150's browser sends, to a web server of social network provider 130, an HTTP request that includes the first URL. In response to receiving the request, the web server identifies web page 420, which is a home or "fan" page of coupon provider 140.

Web page 420 (or the code that is used by a browser to render web page 420) might include a second URL that points to distributor SNP 110. In sending web page 420 to social user 150, social network provider 130 might send, to distributor SNP 110, an HTTP request that includes the second URL. Alternatively, the social user 150's browser sends the HTTP request to distributor SNP 110. The second URL might include data that identifies the coupon or the coupon campaign. For example, the second URL might be http://coupons.com/snp1?campaignid=12345. In an embodiment, web page 420 includes an iframe that includes the second URL. An iframe allows content displayed within the frame to change while the content of other frames within the same webpage to remain unchanged.

In response to receiving the second URL, distributor SNP 110 identifies coupon data, which may be stored in coupon database 114. Each coupon campaign managed by the coupon distributor may be associated with its own coupon data. Coupon data might include a customized template and any images and details of a coupon campaign. In FIG. 4, coupon data includes a pre-like image 422, a post-like image 432, and a thank you image 442. The second URL might include data that identifies in which stage social user 150 is in the coupon access process. For example, a first stage indicates that a pre-like image should be displayed. At this point, distributor SNP 110 identifies pre-like image 422 and sends image 422 (a) to social network provider 130, which forwards image 422 to social user 150 or (b) directly to social user 150. Social user 150's browser displays pre-like image 422 on web page 420. Webpage 420 also includes a Like button 424, which may be provided by social network provider 130.

Social user 150 selects Like button 424, which causes web page 430 to be displayed. Similar to web page 420, web page 430 (or the code that is used by a browser to render web page 420) might include a third URL that points to distributor SNP 110. In sending web page 430 to social user 150, social network provider 130 might send, to distributor SNP 110, an HTTP request that includes the third URL. Alternatively, the social user 150's browser sends the HTTP request to distributor SNP 110. Like the second URL, the third URL might include data that identifies the coupon or the coupon campaign.

Selecting Like button 424 might also cause friends of social user 150 in the social network to be notified that social user 150 "likes" the coupon or the product identified by the coupon.

Selecting Like button 424 might also cause a terms window (whether within web page 420 or separate therefrom) to be displayed to social user 150. The terms window indicates that social user 150 is allowed access to the coupon if social user 150 allows distributor SNP 110 access to some private information of social user 150. The terms window might also require social user 150 to input additional information about social user 150, such as an email address and/or other personal information. In this embodiment, accepting the terms causes web page 430 to be displayed.

In response to receiving the third URL, distributor SNP 110 identifies additional coupon data stored in coupon database 114. Like the second URL, the third URL might include data that identifies in which stage social user 150 is in the coupon access process. For example, a second stage indicates that a post-like image should be displayed. Thus, distributor SNP 110 identifies, in coupon database 114, post-like image 432 and sends image 432 (a) to social network provider 130, which forwards image 432 to social user 150 or (b) directly to social user 150. Social user 150's browser displays post-like image 432 on web page 430. Webpage 430 also includes a Print button 434, which may be provided by social network provider 130 or distributor SNP 110.

Social user 150 selects Print button 434, which allows social user 150 access to the coupon. For example, selection of Print button 434 might cause a print dialog box to be displayed that allows social user 150 to select a local printer to print the coupon. As another example, selection of Print button 434 might cause details about the coupon to be displayed, details that will allow social user 150 to use the coupon, such as in a digital context. Such details might include a coupon code that uniquely identifies the coupon and that social user 150 can use at the manufacturer's website when purchasing the corresponding product.

Alternatively, selection of Print button 434 causes a check to be performed. The check is whether social user 150's computing device includes a customized print driver (described previously). If so, then the customized print driver communicates, to distributor SNP 110, information that identifies the computing device. If not, then social user 150 is required to download the customized print driver from, for example, distributor SNP 110. Based on the identity of the computing device, distributor SNP 110 allows or disallows access to the coupon by social user 150. For example, social user 150 might be limited to printing the coupon only once. If social user 150 has already printed the coupon, then distributor SNP 110. One technique for determining whether social user 150 is allowed access to a coupon is described in U.S. patent application Ser. No. 12/274,348, filed on Nov. 19, 2008, entitled "System And Method For Controlling Use Of A Network Resource", the entire contents of which are hereby incorporated by reference for all purposes as if fully set forth herein.

After successfully printing the coupon (or after accepting the terms that require social user 150 to share personal information with distributor SNP 110), an HTTP request that includes a fourth URL is sent to distributor SNP 110. Like the second and third URLs, the fourth URL might include data that identifies in which stage social user 150 is in the coupon access process. For example, a third stage indicates that a thank you image should be displayed. Thus, distributor SNP 110 identifies, in coupon database 114, thank you image 442 and sends image 442 (a) to social network provider 130, which forwards image 442 to social user 150 or (b) directly to social user 150. Social user 150's browser displays thank you image 442 on web page 440.

6.0. Distributor Using User Data to Distribute Coupons

In an embodiment, once a user of a social network agrees to share private information of the user with a coupon distributor, the coupon distributor can use that information to send targeted messages to that user. The messages may be email messages, text messages, or messages that are sent by a protocol established by the social network provider with which the user is registered.

As indicated previously, distributor SNP 110 stores information about multiple social users in user database 116. Such information is referred to herein as "user profile data." User profile data might indicate, for each user, gender, age, interests, email address, social network user ID, or any other data customarily used to describe a user. Once distributor SNP 110 has details regarding multiple users of social network provider 130, distributor SNP 110 can send, to those users via social network, messages about subsequent coupon campaigns or other promotions to those users.

In an embodiment, distributor SNP 110 uses the user profile data to identify a group of users to which targeted messages will be sent. For example, if a set of users each printed a coupon of a particular product (whether during a single coupon campaign of that product or during one or more of multiple coupon campaigns of that product), then distributor SNP 110 might send, to each user in the set, a message that includes information about another coupon campaign for that product. As another example, distributor SNP 110 might identify a set of users that each accessed a coupon for batteries and send, to each user in that set, a message about coupons for flash lights.

In these two examples, the specific products identified by coupons accessed by users are used to identify a group of users to send a particular message. Additionally or alternatively, a group of users might be identified based on information about the users themselves. For example, all male users over the age of 50 are sent a message that includes information about a coupon for a hair loss product. As another example, all users that have expressed an interest in golf are sent a message about a coupon for golf equipment from a particular retailer. As another example, all users that have "Liked" a certain artist are sent a message about obtaining tickets to a concert in which that artist will perform.

Thus, regardless of which coupon first influenced various users to share their private information with distributor SNP 110, many coupon providers and other product/service promoting entities might contract with the coupon distributor (i.e., that operates distributor SNP 110) to send targeted messages to users.

7.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
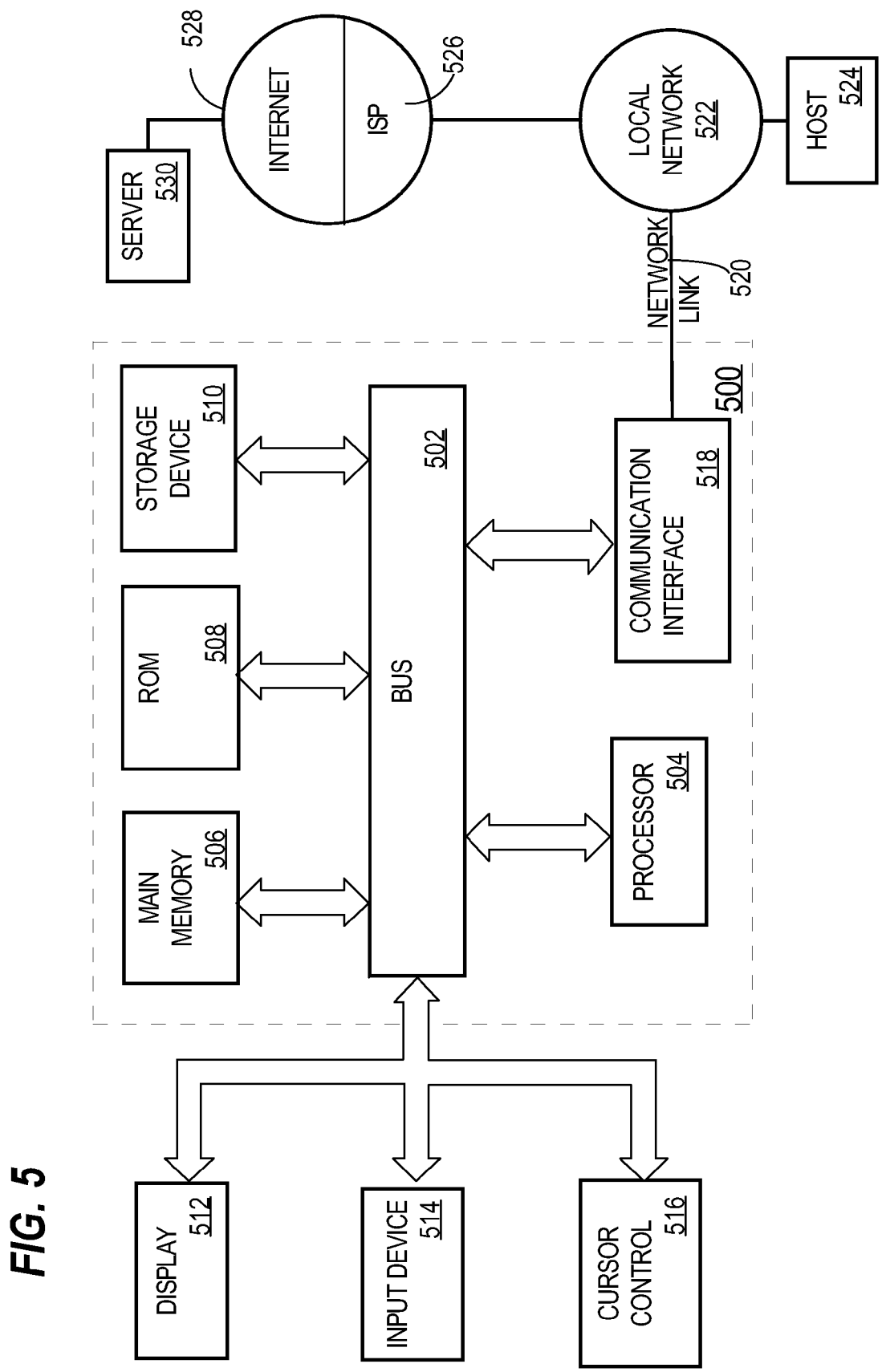
FIG. 5 is block diagram of a computer system upon which embodiments of the invention may be implemented.

For example, FIG. 5 is a block diagram that illustrates a computer system 500. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process blocks described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

8.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving, at a social network coupon platform, a request to display coupon data regarding a particular coupon that is provided by a coupon provider that provides a product or service to which the particular coupon pertains, wherein a user that initiated the request is registered with a social network provider that provides a social networking service and that maintains a social graph;
    in response to receiving the request, sending, from the social network coupon platform that is different than the social network provider, the coupon data to be displayed to the user;
    after sending the coupon data, receiving, at the social network coupon platform, from the social network provider, profile data that includes profile information of the user;
    in response to receiving the profile data, allowing the user access to the particular coupon;
    wherein the method is performed by one or more computing devices.

2. The method of claim 1, further comprising;
    storing, at the social network coupon platform, coupon campaign data that indicates a plurality of coupon campaigns that includes a first coupon campaign initiated by a first coupon provider and a second coupon campaign initiated by a second coupon provider that is different than the first coupon provider;
    receiving a second request to display second coupon data regarding a second particular coupon that is provided by the second coupon provider, wherein a second user that initiated the second request is registered with a second social network provider that provides a second social networking service;
    in response to receiving the second request, causing the second coupon data to be displayed to the second user;
    receiving, from the second social network provider, second profile data that includes second profile information of the second user;
    in response to receiving the second profile data, allowing the second user access to the second particular coupon.

3. The method of claim 1, wherein the user is a first user and the profile data is of the first user, the method further comprising:
    receiving a second request to display second coupon data regarding the particular coupon that is provided by the coupon provider, wherein a second user that initiated the second request is registered with the social network provider and is different than the first user;
    in response to receiving the second request, causing the second coupon data to be displayed to the second user;
    receiving, from the social network provider, second profile data that includes second profile information of the second user;
    in response to receiving the second profile data, allowing the second user access to the particular coupon;
    storing, at the social network coupon platform, user data that includes information about a plurality of users that are registered with the social network provider, wherein the plurality of users includes the first user and the second user.

4. The method of claim 3, wherein the social network provider is a first social network provider, wherein the user data includes information about a second plurality of users that are registered with a second social network provider that is different than the first social network provider, the method comprising:
    receiving a third request to display third coupon data regarding a second particular coupon that is provided by a second coupon provider, wherein a third user that initiated the third request is registered with the second social network provider;
    in response to receiving the third request, causing the third coupon data to be displayed to the third user;

receiving, from the second social network provider, third
profile data that includes third profile information of the
third user;
in response to receiving the third profile data, allowing the
third user access to the particular coupon;
wherein the second plurality of users includes the third
user.

5. The method of claim 3, wherein the user data includes, for each user of the plurality of users, one or more of gender, age, geographic information, one or more interests, and contact information.

6. The method of claim 3, further comprising, while storing information about a particular user that is registered with the social network provider, sending, from the social network coupon platform, to the social network provider, a request for additional information about the particular user.

7. The method of claim 1, further comprising:
storing, at the social network coupon platform, a plurality of templates;
receiving, at the social network coupon platform, from the coupon provider, a request for a particular template from the plurality of templates;
receiving, from the coupon provider, customization data to be applied to the particular template; and
storing, at the social network coupon platform, the customization data in association with the particular template.

8. The method of claim 7, further comprising, in response to receiving the request, identifying a customized template from among a plurality of customized templates, wherein the coupon data is reflected in the customized template.

9. The method of claim 1, wherein allowing access to the particular coupon comprises allowing the user to print the particular coupon.

10. The method of claim 1, wherein allowing access to the particular coupon comprises causing a coupon code to be displayed to the user, wherein the coupon code is required to redeem the particular coupon.

11. The method of claim 1, wherein the profile data is sent from the social network provider to the social network coupon platform only after the user accepts one or more terms to allow the social network coupon platform to access the profile data.

12. The method of claim 1, wherein the request is received from a browser executing on a computing device of the user.

13. One or more storage media storing instructions which, when executed by one or more processors, cause:
receiving, at a social network coupon platform, a request to display coupon data regarding a particular coupon that is provided by a coupon provider that provides a product or service to which the particular coupon pertains, wherein a user that initiated the request is registered with a social network provider that provides a social networking service and that maintains a social graph;
in response to receiving the request, sending, from the social network coupon platform that is different than the social network provider, the coupon data to be displayed to the user;
after sending the coupon data, receiving, at the social network coupon platform, from the social network provider, profile data that includes profile information of the user;
in response to receiving the profile data, allowing the user access to the particular coupon.

14. The one or more storage media of claim 13, wherein the instructions include instructions which, when executed by the one or more processors, further cause:
storing, at the social network coupon platform, coupon campaign data that indicates a plurality of coupon campaigns that includes a first coupon campaign initiated by a first coupon provider and a second coupon campaign initiated by a second coupon provider that is different than the first coupon provider;
receiving a second request to display second coupon data regarding a second particular coupon that is provided by the second coupon provider, wherein a second user that initiated the second request is registered with a second social network provider that provides a second social networking service;
in response to receiving the second request, causing the second coupon data to be displayed to the second user;
receiving, from the second social network provider, second profile data that includes second profile information of the second user;
in response to receiving the second profile data, allowing the second user access to the second particular coupon.

15. The one or more storage media of claim 13, wherein the user is a first user and the profile data is of the first user, wherein the instructions include instructions which, when executed by the one or more processors, further cause:
receiving a second request to display second coupon data regarding the particular coupon that is provided by the coupon provider, wherein a second user that initiated the second request is registered with the social network provider and is different than the first user;
in response to receiving the second request, causing the second coupon data to be displayed to the second user;
receiving, from the social network provider, second profile data that includes second profile information of the second user;
in response to receiving the second profile data, allowing the second user access to the particular coupon;
storing, at the social network coupon platform, user data that includes information about a plurality of users that are registered with the social network provider, wherein the plurality of users includes the first user and the second user.

16. The one or more storage media of claim 15, wherein the social network provider is a first social network provider, wherein the user data includes information about a second plurality of users that are registered with a second social network provider that is different than the first social network provider, wherein the instructions, when executed by one or more processors, further cause:
receiving a third request to display third coupon data regarding a second particular coupon that is provided by a second coupon provider, wherein a third user that initiated the third request is registered with the second social network provider;
in response to receiving the third request, causing the third coupon data to be displayed to the third user;
receiving, from the second social network provider, third profile data that includes third profile information of the third user;
in response to receiving the third profile data, allowing the third user access to the particular coupon;
wherein the second plurality of users includes the third user.

17. The one or more storage media of claim 15, wherein the user data includes, for each user of the plurality of users, one or more of gender, age, geographic information, one or more interests, and contact information.

18. The one or more storage media of claim 15, wherein the instructions include instructions which, when executed by the one or more processors, further cause, while storing information about a particular user that is registered with the social network provider, sending, from the social network coupon platform, to the social network provider, a request for additional information about the particular user.

19. The one or more storage media of claim 13, wherein the instructions include instructions which, when executed by the one or more processors, further cause:
- storing, at the social network coupon platform, a plurality of templates;
- receiving, at the social network coupon platform, from the coupon provider, a request for a particular template from the plurality of templates;
- receiving, from the coupon provider, customization data to be applied to the particular template; and
- storing, at the social network coupon platform, the customization data in association with the particular template.

20. The one or more storage media of claim 19, wherein the instructions include instructions which, when executed by the one or more processors, further cause, in response to receiving the request, identifying a customized template from among a plurality of customized templates, wherein the coupon data is reflected in the customized template.

21. The one or more storage media of claim 13, wherein allowing access to the particular coupon comprises allowing the user to print the particular coupon.

22. The one or more storage media of claim 13, wherein allowing access to the particular coupon comprises causing a coupon code to be displayed to the user, wherein the coupon code is required to redeem the particular coupon.

23. The one or more storage media of claim 13, wherein the profile data is sent from the social network provider to the social network coupon platform only after the user accepts one or more terms to allow the social network coupon platform to access the profile data.

24. The one or more storage media of claim 13, wherein the request is received from a browser executing on a computing device of the user.

25. The one or more storage media of claim 21, wherein the instructions, when executed by the one or more processors, further cause, prior to allowing the user to print the particular coupon:
- determining that a printer driver is installed on a client device of the user;
- receiving data from the printer driver;
- determining whether to allow the user to print the particular coupon based on the data.

26. The one or more storage media of claim 13, wherein the instructions, when executed by the one or more processors, further cause:
- causing a message to be sent to a plurality of other users that are identified, in the social graph, as connected to the user, wherein the message includes data about the particular coupon.

27. The one or more storage media of claim 13, wherein the coupon data is first coupon data, wherein the instructions, when executed by the one or more processors, further cause, prior to allowing the user access to the particular coupon:
- after sending the coupon data, receiving an indication that the user has performed one or more actions that are required to receive the particular coupon;
- in response to receiving the indication, causing second coupon data, that is different than the first coupon data, to be displayed to the user, wherein the second coupon data prompts the user to perform one or more additional actions in order to receive the particular coupon.

\* \* \* \* \*